US010733958B1

(12) United States Patent
Kuo

(10) Patent No.: US 10,733,958 B1
(45) Date of Patent: Aug. 4, 2020

(54) CIRCUIT FOR PERFORMING DEMURA OPERATION FOR A DISPLAY PANEL

(71) Applicant: Hung-Cheng Kuo, Hsinchu (TW)

(72) Inventor: Hung-Cheng Kuo, Hsinchu (TW)

( * ) Notice: Subject to any disclaimer, the term of this patent is extended or adjusted under 35 U.S.C. 154(b) by 0 days.

(21) Appl. No.: 16/669,354

(22) Filed: Oct. 30, 2019

(51) Int. Cl.
*H04N 11/20* (2006.01)
*G09G 5/06* (2006.01)

(52) U.S. Cl.
CPC ......... *G09G 5/06* (2013.01); *G09G 2310/027* (2013.01); *G09G 2320/0233* (2013.01)

(58) Field of Classification Search
CPC .......... G09G 3/36; G09G 5/10; G09G 3/3208; G09G 3/20; H04N 9/77; H04N 11/20; G06T 5/00
See application file for complete search history.

(56) References Cited

U.S. PATENT DOCUMENTS

2016/0093257 A1* 3/2016 Wu .......................... G09G 5/10 345/690
2016/0267838 A1* 9/2016 Zhang .................. G09G 3/2003

* cited by examiner

*Primary Examiner* — Michael A Faragalla
(74) *Attorney, Agent, or Firm* — Hamre, Schumann, Mueller & Larson, P.C.

(57) ABSTRACT

A circuit for performing demura operation for a display panel of a computerized device is provided. The circuit includes an arithmetic unit for converting input luminance codes (e.g., grayscale codes) that correspond to a first group of pixels to output luminance codes by computation, and a lookup table unit having a storage module for mapping input luminance codes that correspond to a second group of pixels to output luminance codes. Such a configuration uses the lookup table unit to replace some computations for demura operation, thereby reducing time and power required for demura operation.

8 Claims, 6 Drawing Sheets

CIRCUIT FOR PERFORMING DEMURA OPERATION FOR A DISPLAY PANEL

FIELD

The disclosure relates to a circuit for providing pixel data to a display panel, and more particularly to a circuit for performing demura operation for a display panel.

BACKGROUND

In the display panel industry, mura, referring to the non-uniformity of a display panel in terms of luminance, is always a problem to be solved. Mura may result from the inability to perform consistent and satisfactory manufacturing process control, such as control of a vapor deposition process for OLED panels, a mass transfer process for micro LED panels, etc. Therefore, multiple demura (i.e., mura correction or elimination) technologies have been developed to alleviate the mura effect for display panels.

Because the mura defect of a display panel usually results from different pixels outputting different luminance for the same grayscale, one demura technology is to, for each pixel, adjust the grayscale code based on a desired pixel characteristic so as to make the pixel output a desired luminance in response to the originally received grayscale code.

FIG. 1 is a plot that exemplarily shows a curve (C1) representing a desired pixel characteristic, and a curve (C2) representing an actual pixel characteristic of a pixel (e.g., a red pixel, a green pixel, a blue pixel, etc.). In order to reduce the difference between the desired pixel characteristic and the actual pixel characteristic of the pixel, the grayscale code input for the pixel is adjusted to another grayscale code so that the pixel outputs the desired luminance (i.e., the luminance that corresponds to the input grayscale code according to the desired pixel characteristic). Taking FIG. 1 as an example, a grayscale code of 175 that is inputted for the pixel would be adjusted to 200 so that the pixel outputs the desired luminance of L1, which corresponds to the grayscale code of 175 in the desired pixel characteristic (see the curve (C1))

A display panel includes millions of pixels (e.g., input grayscale versus output luminance). If the adjustments of grayscale codes for the pixels are all completed by computation, it would be time-consuming and energy-consuming.

SUMMARY

Therefore, an object of the disclosure is to provide a circuit that can alleviate at least one of the drawbacks of the prior art.

According to the disclosure, the circuit for performing demura operation for a display panel of a computerized device is provided. The display panel includes a plurality of pixels. The circuit includes a storage module and a data conversion module. The storage module stores, for each of the pixels, a pixel information piece that is related to a luminance characteristic of the pixel and that indicates whether the pixel belongs to a first pixel group or a second pixel group. The data conversion module is coupled to the storage module for receiving the pixel information pieces for the pixels, and is disposed to receive, for each frame to be displayed by the display panel, frame data that includes an input luminance code for each of the pixels. The data conversion module is configured to, for each of the pixels, convert the input luminance code for the pixel to an output luminance code based on the corresponding one of the pixel information pieces. The data conversion module includes an arithmetic unit and a lockup table unit. The arithmetic unit includes an arithmetic circuit to process the frame data corresponding to those of the pixels that belong to the first pixel group by computing, for each of those of the pixels that belong to the first pixel group, the output luminance code based on the input luminance code for the pixel and the corresponding one of the pixel information pieces. The lookup table unit is configured to process the frame data corresponding to those of the pixels that belong to the second pixel group, and includes a mapping module. The mapping module stores multiple sets of luminance codes corresponding to those of the pixels that belong to the second pixel group, and is configured to, for each of those of the pixels that belong to the second pixel group, determine one of the sets of luminance codes based on the corresponding one of the pixel information pieces, and to map the input luminance code for the pixel to the output luminance code based on the determined one of the sets of luminance codes.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
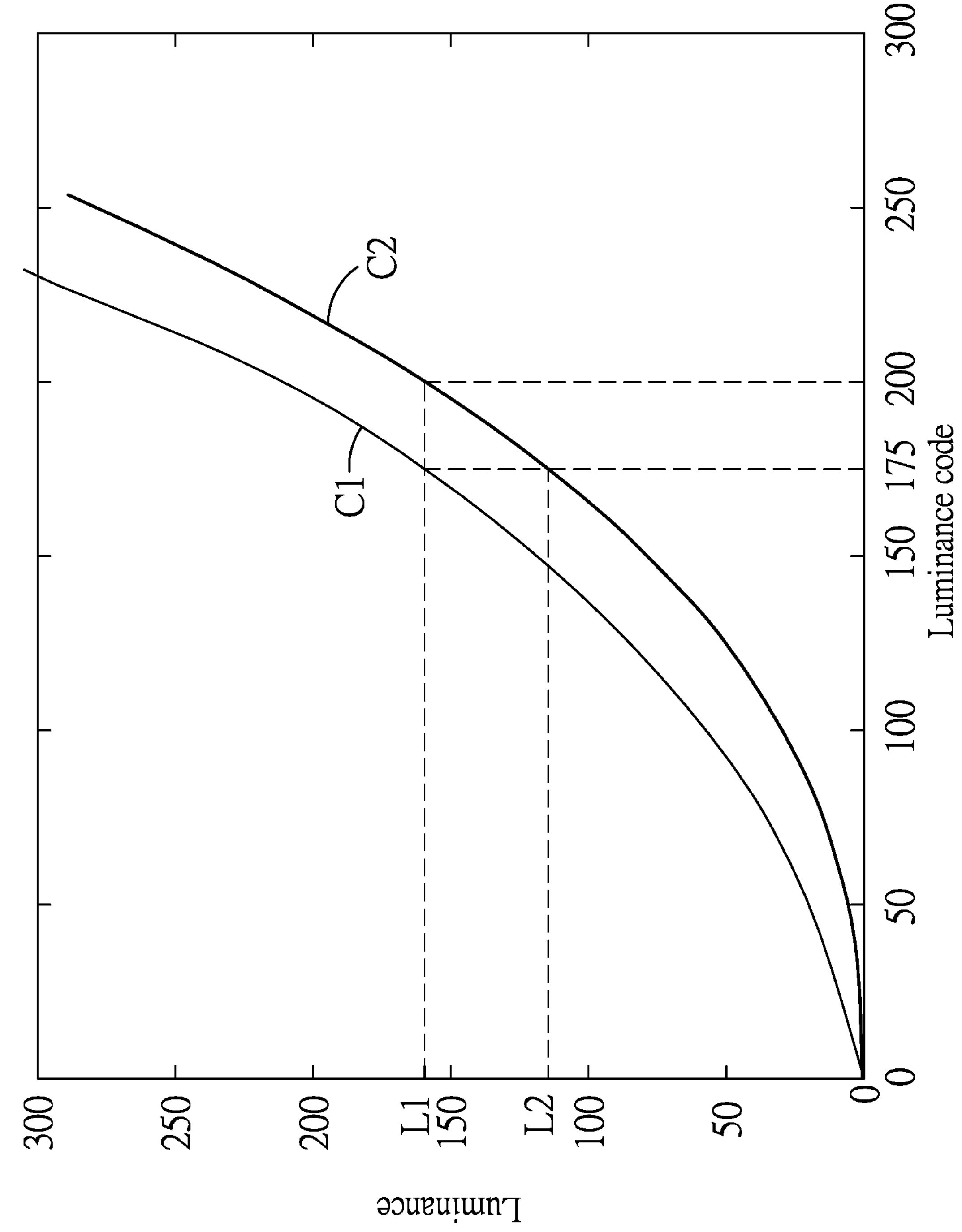
FIG.1 Prior art
FIG. 1 is a plot illustrating demura operation.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
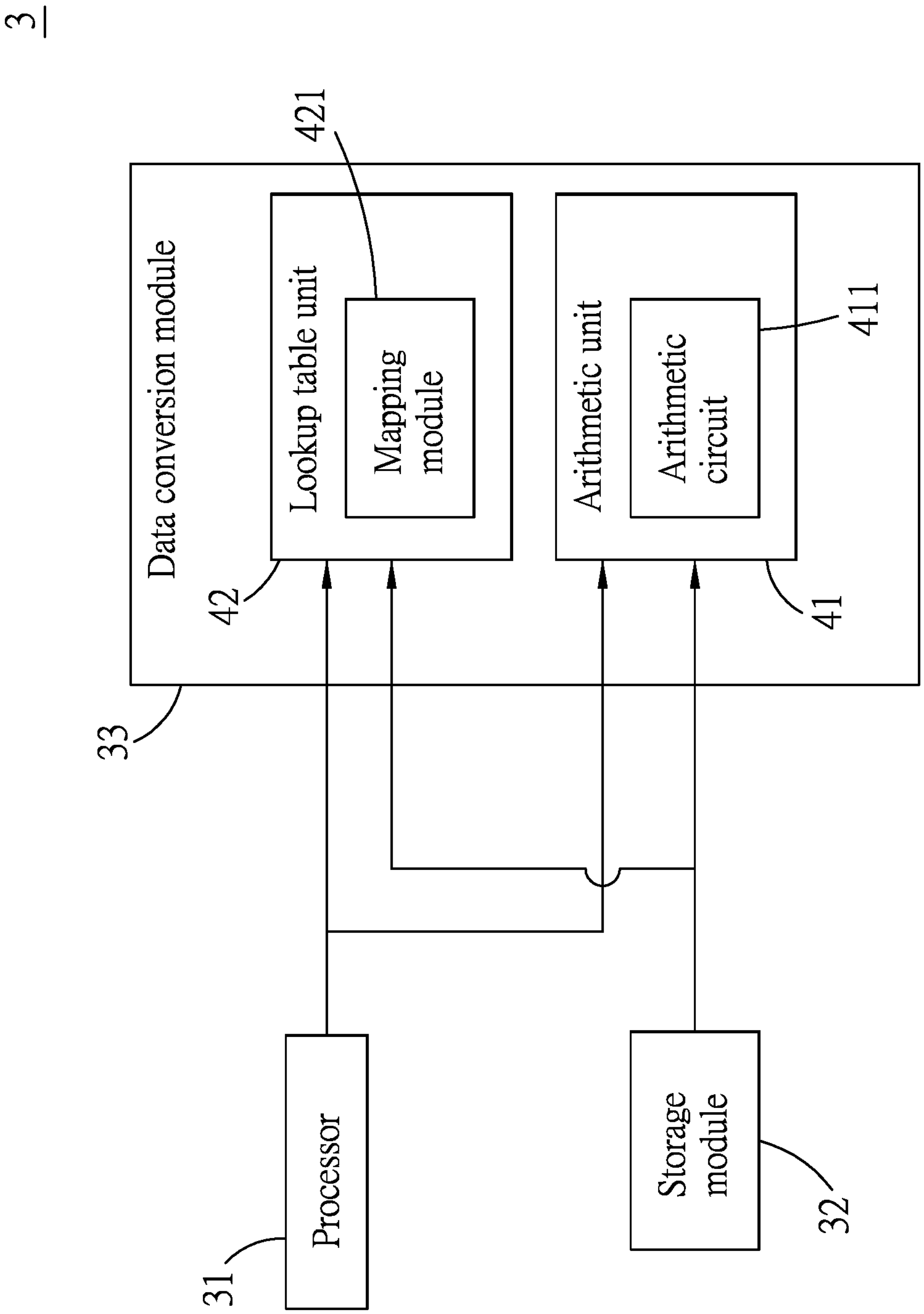
FIG. 2 is a block diagram illustrating an embodiment of a circuit for performing demura operation according to this disclosure.

FIG. 2 shows an embodiment of a circuit 3 for performing demura operation for a display panel of a computerized device. The display panel includes a plurality of pixels. The circuit 3 includes a processor 31, a storage module 32 and a data conversion module 33.

During the production of the display panel, the panel manufacturer may use an automated optical inspection (AOI) system to measure a luminance characteristic, which refers to a relationship between luminance codes and luminance, for each of the pixels of the display panel. It is noted that the luminance codes may be represented in a form of grayscale codes, control codes or voltages, and this disclosure is not limited in this respect. In order to perform demura operation, the panel manufacturer may use a plurality of parameter sets in cooperation with a predetermined type of function (e.g., a polynomial function with a predetermined degree) to describe the luminance characteristics of the pixels. Since most pixels would have similar luminance characteristics, the panel manufacturer may use several hundreds or several thousand of polynomial functions to describe the luminance characteristics of millions of pixels of the display panel. In practice, most of the pixels (e.g., more than 90% of the pixels) can be described using a relatively small number of parameter sets (e.g., about thirty), and the remaining several hundred or several thousand polynomial functions are used to describe the remaining pixels (e.g., less than 10% of the pixels) which are dissimilar to most pixels in terms of luminance characteristic. In order to accelerate the demura operation and save power, this disclosure proposes to adjust luminance codes through computation only for a small part of the pixels (such as the abovementioned "remaining pixels"), and to adjust luminance codes for most pixels that correspond to selected dozens of the polynomial functions by use of lockup tables. In this disclosure, the small part of the pixels are classified into a first pixel group, and the other pixels (most pixels) are classified into a second pixel group.

The processor 31 is mounted to a main board of the computerized device, and provides, for each frame to be displayed by the display panel, frame data that includes an input luminance code for each of the pixels.

The storage module 32 may include a memory unit that is realized as, for example, a combination of a non-volatile computer readable medium (e.g., a flash memory module, a hard disk drive, a read only memory, etc.) and a volatile computer readable medium (e.g., SRAM, DRAM, etc.; however, SRAM is preferred due to its fast speed in terms of read/write operation). The non-volatile computer readable medium stores, for each of the pixels, a pixel information piece that is related to a luminance characteristic of the pixel and that indicates whether the pixel belongs to the first pixel group or the second pixel group. When the demura operation begins, the pixel information pieces for the pixels may be loaded into the volatile computer readable medium to reduce the time required for data retrieval. In practice, the input luminance codes for the pixels are provided one by one in a predetermined sequence, so the storage module 32 can use, for example, a counter, to output the pixel information pieces one by one correspondingly based on the predetermined sequence.

The data conversion module 33 is coupled to the storage module 32 for receiving the pixel information pieces for the pixels, and is coupled to the processor 31 for receiving the frame data. The data conversion module 33 is configured to, for each of the pixels, convert the input luminance code for the pixel to an output luminance code based on the corresponding one of the pixel information pieces. In this embodiment, the data conversion module 33 includes an arithmetic unit 41 and a lookup table unit 42.

The arithmetic unit 41 includes an arithmetic circuit 411 to process the frame data corresponding to the pixels in the first pixel group by computing, for each of the pixels in the first pixel group, the output luminance code based on the input luminance code and the corresponding one of the pixel information pieces. In this embodiment, the pixel information piece corresponding to the pixel in the first pixel group includes a set of parameters that corresponds to a predetermined type of function (e.g., a polynomial function with a predetermined degree) which is used to convert an input luminance code to an output luminance code. For example, the predetermined type of function may be a 4-degree polynomial function of $p(x)=ax^4+bx^3+cx^2+dx+e$, and the set of parameters included in the pixel information piece may include five numbers respectively for the parameters a, b, c, d and e. The arithmetic circuit 411 performs, for each of the pixels in the first pixel group, computation using the predetermined type of function in cooperation with the input luminance code that corresponds to the pixel and the set of parameters included in the corresponding one of the pixel information pieces, so as to obtain the output luminance code corresponding to the pixel.

The lookup table unit 42 is configured to process the frame data corresponding to the pixels in the second pixel group, and includes a mapping module 421 storing multiple sets of luminance codes corresponding to the second pixel group. For each of the pixels in the second pixel group, the mapping module 421 is configured to determine one of the sets of luminance codes based on the corresponding one of the pixel information pieces, and to map the input luminance code for the pixel to an output luminance code based on the determined one of the sets of luminance codes. In this embodiment, the pixel information piece corresponding to a pixel in the second pixel group includes said one of the sets of luminance codes for the pixel. In one example where the display panel is an 8-bit display panel, each set of luminance codes may include $2^8=256$ luminance codes respectively corresponding to 256 possible input luminance codes. Taking FIG. 1 as an example, the set of luminance codes that corresponds to the corresponding pixel would include a luminance code of 200 that corresponds to the input luminance code of 175, and the mapping module 421 would map the input luminance code of 175 to the output luminance code of 200 based on the set of luminance codes indicated by the pixel information piece.

In one embodiment, the storage module 32 may be connected to a trigger unit (not shown) and provide the pixel information piece thereto. The trigger unit outputs to the data conversion module 33 a trigger signal that indicates whether the pixel corresponding to the pixel information piece belongs to the first pixel group or the second pixel group. For example, the trigger signal may be at logic 0 when the pixel belongs to the first pixel group, and at logic 1 when the pixel belongs to the second pixel group. The trigger signal enables operation of the arithmetic circuit 411 when indicating that the pixel corresponding to the pixel information piece belongs to the first pixel group, and enables operation of the mapping module 421 when indicating that the pixel corresponding to the pixel information piece belongs to the second pixel group. In one embodiment, the trigger unit may be included in the data conversion module 33. In one embodiment, the pixel information piece may be directly used to enable or disable operation of each of the arithmetic circuit 411 and the mapping module 421, and the trigger unit may be omitted.

Source drivers of the display panel receive processed frame data that includes the output luminance codes from the data conversion module 33, and drive the pixels of the display panel to display images.

Figure 3:
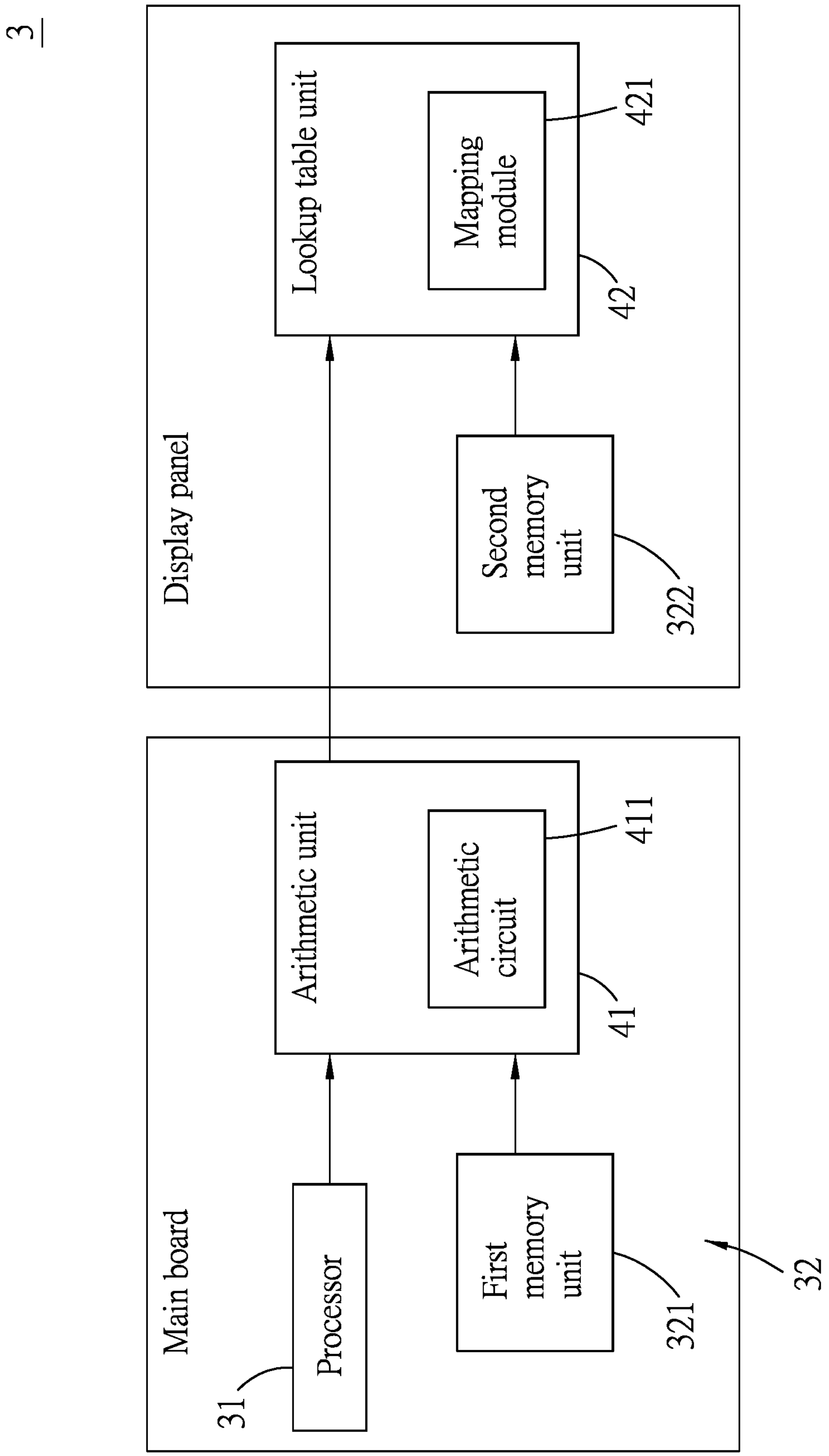
FIG. 3 is a block diagram illustrating a variation of the embodiment.

FIG. 3 shows a variation of the embodiment of the circuit 3. In this variation, the storage module 32 includes a first memory unit 321 and a second memory unit 322. The first memory unit 321 and the arithmetic unit 41 are disposed on one of the main board and the display panel, and the second memory unit 322 and the lookup table unit 42 are disposed on the other one of the main board and the display panel. In practice, the arithmetic unit 41 may be integrated in a chipset on the main board because, in the computerized device, such as a smartphone, the chipset on the main board usually has better arithmetic capability than the display panel, but this does not mean that the arithmetic unit 41 cannot be set up on the display panel. In this variation, for each pixel, the pixel information piece includes a first pixel information piece and a second pixel information piece, each related to the luminance characteristic of the pixel and indicating whether the pixel belongs to the first pixel group or the second pixel group. The first memory unit 321 stores the first pixel information pieces for the pixels, and the second memory unit 322 stores the second pixel information pieces for the pixels. The arithmetic unit 41 is coupled to the first memory unit 321 for receiving the first pixel information pieces therefrom, and the lookup table unit 42 is coupled to the second memory unit 321 for receiving the second pixel information pieces therefrom. The arithmetic unit 41 receives the frame data from the processor 31, computes the output luminance codes for the pixels in the first pixel group, and bypasses the input luminance codes for those pixels that belong to the second pixel group. Since the arithmetic unit 41 may process data for one pixel at a time, the output luminance codes computed for the pixels in the first pixel group and the bypassed input luminance codes corresponding to the pixels in the second pixel group may be stored in a buffer (not shown) one by one temporarily. After the computed output luminance code or the bypassed input luminance code for each pixel is stored in the buffer, the partly processed frame data, which includes the computed output luminance codes for all the pixels in the first pixel group and the bypassed input luminance codes for all the pixels in the second pixel group, are provided to the lookup table unit 42 for obtaining the output luminance codes for the pixels in the second pixel group. This variation uses an additional memory unit to realize a cascade circuit structure, which establishes a pipeline architecture where a part of the frame data is processed on the main board and the other part of the frame data is processed on the display panel, thereby reducing layout difficulty and cost for producing the IC chip, which may otherwise be a serious problem when the arithmetic unit 41 and the lookup table unit 42 are both set up on the main board or both set up on the display panel.

In this variation, for each of the pixels, the first pixel information piece may be identical to the second pixel information piece, with the first pixel information piece recording detailed luminance characteristic of the corresponding pixel. Alternatively, since the arithmetic unit 41 does not perform computation for the pixels belonging to the second pixel group, the first pixel information piece for each of these pixels of the second pixel group only needs to include information indicating that the corresponding pixel belongs to the second pixel group, into which the pixel is classified due to its luminance characteristic, and detailed information, such as the corresponding set of luminance codes, may be omitted from the first pixel information piece. In such a case, the first pixel information pieces for the pixels in the second pixel group can all be the same, each simply indicating that the corresponding pixel belongs to the second pixel group. Since most pixels, which may make up up to 99% of the pixels, belong to the second pixel group, storage capacity required of the first memory unit 321 may be significantly reduced by making the first pixel information pieces for all pixels in the second pixel group the same. In one experiment where the display panel has 1920×720 pixels of which the luminance characteristic can be described using 718 polynomial functions, 98.12% of the pixels can be described using 30 out of the 718 polynomial functions. In a case where the first pixel information pieces recorded detailed information for all of the pixels, a compressed data size of the first pixel information pieces was 14.88 Mb. However, if the first pixel information pieces for the pixels in the second pixel group (those pixels that correspond to the 30 polynomial functions out of the 718 polynomial functions) omitted the detailed information and thus were identical to each other, the compressed data size of the first pixel information pieces would become 4.65 Mb, thereby significantly reducing the required memory capacity, which may lead to a smaller layout area dedicated for the memory, and lower cost for the memory. Moreover, in such a scenario, the arithmetic unit 41 can handle the data for the pixels in the second pixel group relatively faster because less time is required for reading the corresponding first pixel information piece (the data size is smaller due to omission of the detailed information) and no computation is required for the corresponding first pixel information piece.

In practice, pixels with relatively uncommon luminance characteristics (i.e., the pixels in the first pixel group; for example, the 1.88% of the pixels that correspond to the 718−30=688 polynomial functions in the abovementioned experiment) are usually clustered at specific parts of the display panel, such as the top region or the bottom region of the display panel. If the input luminance codes of the frame data are provided in a sequence based on location of pixel in order from top to bottom of the display panel, the arithmetic unit 41 (see FIGS. 2 and 3) would have a heavy workload at the beginning (corresponding to the top region) and towards the end (corresponding to the bottom region) of the entire duration of processing the frame data, and a light workload during the intermediate portion of the duration, which is inefficient. Such arrangement is inefficient because the arithmetic unit 41 would spend a lot of time idling during the intermediate portion of the duration, and would be busy processing the frame data corresponding to the bottom region, which is a heavy load, during the end portion of the duration. In order to improve the efficiency in time utilization, the processor 31 may be configured to output the frame data to the data conversion module 33 in a manner that the input luminance codes for the pixels in a region with relatively fewer pixels that belong to the first pixel group are outputted last, so as to earn more time for the arithmetic unit 41 to process the data for the pixels in a region with relatively more pixels that belong to the first pixel group. In detail, a display area of the display panel may be divided into multiple predetermined display regions, each of which has a first-group density defined as a density of pixels belonging to the first pixel group in the predetermined display region. Preferably, each of the predetermined display regions includes at least ten rows of pixels of the display panel. The predetermined display regions can be classified into a first display group and a second display group based on a predetermined density threshold related to the first-group density. For instance, the first-group density of each of the predetermined display regions in the first display group is greater than or equal to the predetermined density threshold, and the first-group density of each of the predetermined display regions in the second display group is smaller than the predetermined density threshold. The processor 31 may be configured to output the frame data to the data conversion module 33 in a manner that the input luminance codes for the pixels in one of the predetermined display regions belonging to the second display group are outputted last.

Figure 4:
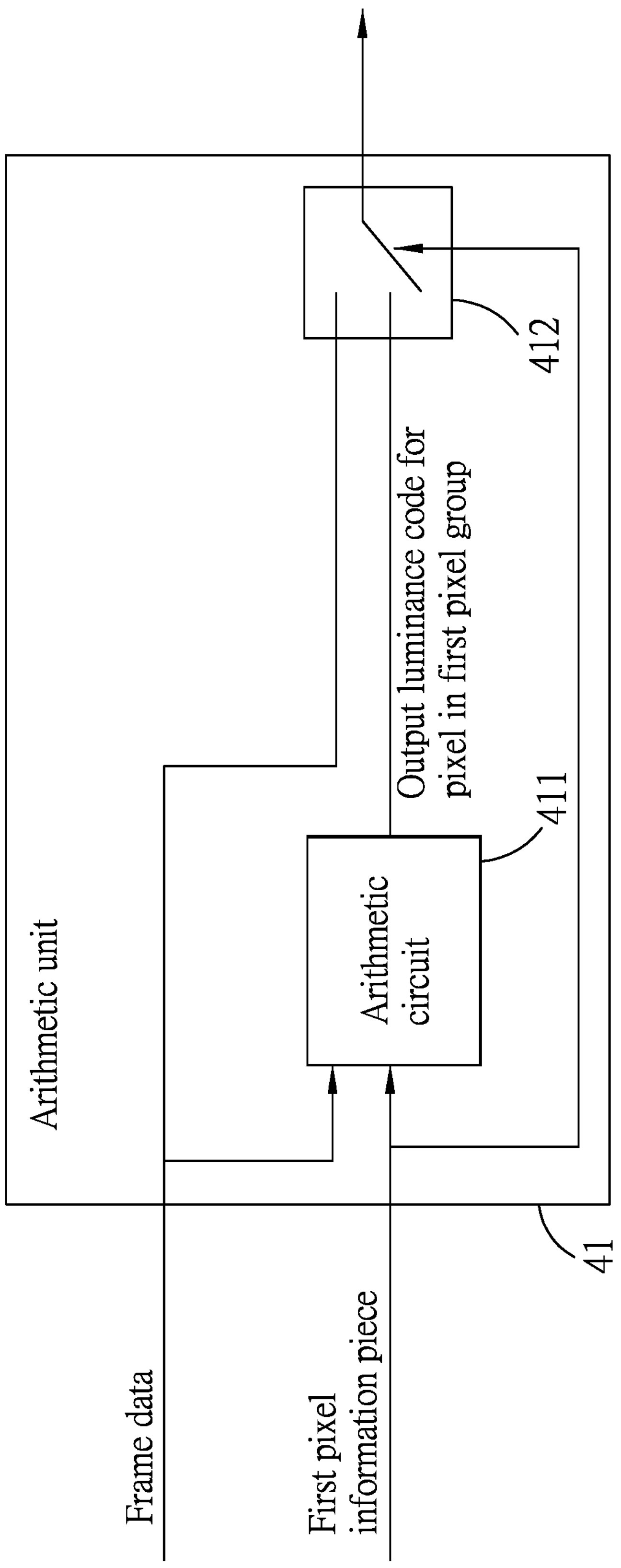
FIG. 4 is a block diagram illustrating an arithmetic unit of the variation.

FIG. 4 illustrates an exemplary structure of the arithmetic unit 41 in FIG. 3. The first pixel information piece or the trigger signal that is generated based on the first pixel information piece enables operation of the arithmetic circuit 411 when the first pixel information piece indicates that the corresponding pixel belongs to the first pixel group, and disables operation of the arithmetic circuit 411 when otherwise. The arithmetic unit 41 further includes a switch component 412 having a first switch input coupled to the processor 31 (see FIG. 3) for receiving the frame data (pixel data for the arithmetic unit 41 in FIG. 3) therefrom, a second switch input coupled to the arithmetic circuit 411 for receiving the output luminance codes for the pixels in the first pixel group therefrom, and a switch output selectively connected to one of the first switch input and the second switch input based the first pixel information piece currently provided to the arithmetic unit 41 (or the trigger signal, which is generated based on the first pixel information piece currently provided to the arithmetic unit 41). When the first pixel information piece indicates that the pixel to which the currently received input luminance code corresponds belongs to the first pixel group, the switch output is connected to the second switch input so as to output the output luminance code computed by the arithmetic circuit 411 for the pixel which belongs to the first pixel group, or otherwise the switch output is connected to the first switch input so as to output the input luminance code received from the processor 31 (i.e., to bypass the input luminance code for the pixel which belongs to the second pixel group).

Figure 5:
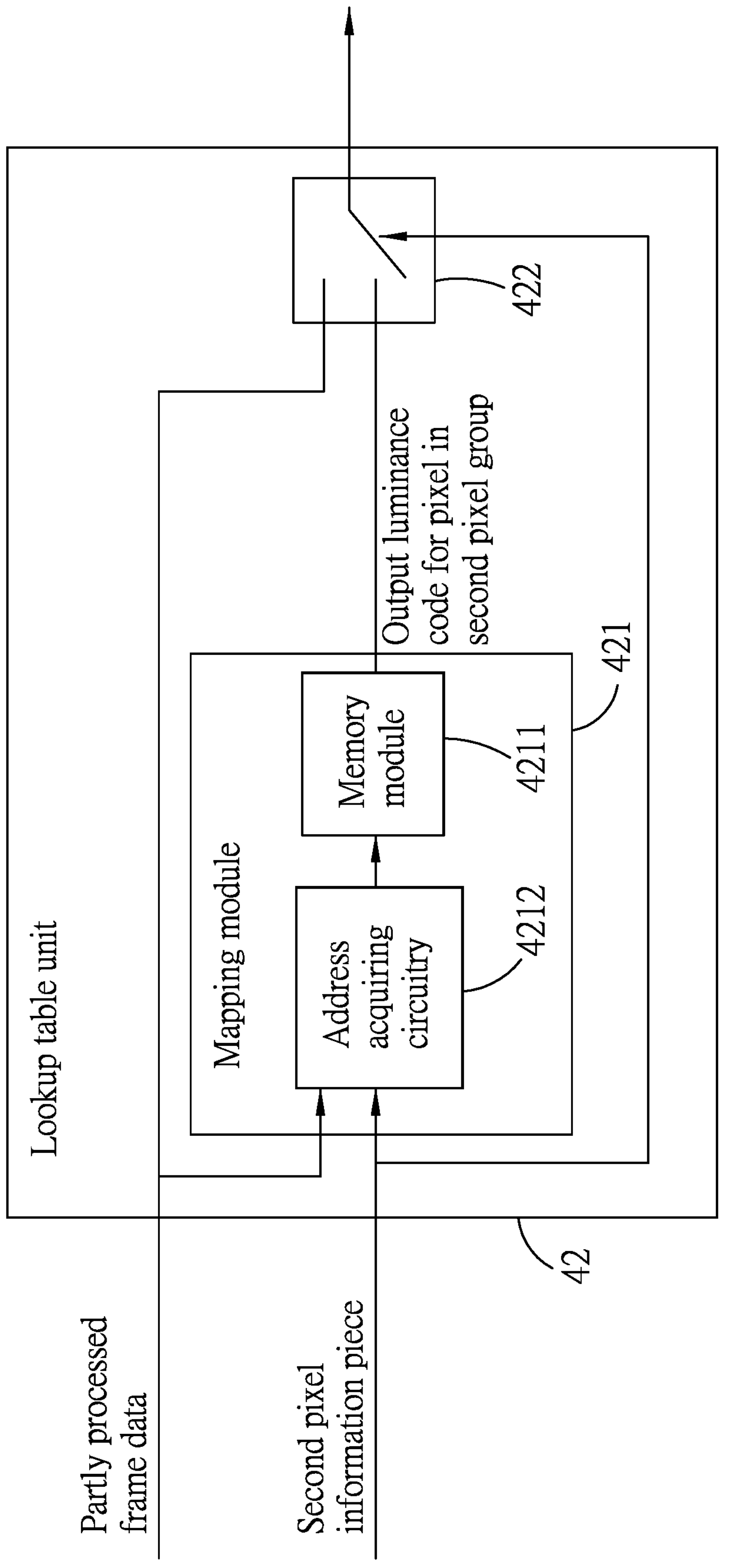
FIG. 5 is a block diagram illustrating a lookup table unit of the variation.

FIG. 5 illustrates an exemplary structure of the lookup table unit 42 in FIG. 3. The mapping module 421 of the lookup table unit 42 includes a memory module 4211 (e.g., an SRAM module, a DRAM module, etc.; however, the SRAM module is preferred due to its fast speed in terms of read/write operation) that stores the multiple sets of luminance codes, and an address acquiring circuitry 4212. The address acquiring circuitry 4212 is configured to compute, for each of the pixels in the second pixel group, address information that indicates where the output luminance code that maps the input luminance code for the pixel is stored in the memory module 4211, based on the second pixel information piece corresponding to the pixel. The memory module 4211 is coupled to the address acquiring circuitry 4212 for receiving the address information acquired for each of the pixels in the second pixel group, and outputs the output luminance code that corresponds to the input luminance code for the pixel based on the address information. The second pixel information piece or the trigger signal that is generated based on the second pixel information piece enables operation of the mapping module 421 when the second pixel information piece indicates that the corresponding pixel belongs to the second pixel group, and disables operation of the mapping module 421 when otherwise. The lockup table unit 42 further includes a switch component 422 having a first switch input coupled to the arithmetic unit 41 for receiving the partly processed frame data (pixel data for the lookup table unit 42 in FIG. 3) therefrom, a second switch input coupled to the mapping module 421 for receiving the output luminance codes for the pixels in the second pixel group therefrom, and a switch output selectively connected to one of the first switch input and the second switch input based on the second pixel information piece currently provided to the mapping module 421 (or the trigger signal, which is generated based on the second pixel information piece currently provided to the mapping module 421). When the second pixel information piece indicates that the pixel to which the currently received input luminance code belongs to the second pixel group, the switch output is connected to the second switch input to output the output luminance code looked up for the pixel which belongs to the second pixel group, or otherwise the switch output is connected to the first switch input to output the output luminance code received from the arithmetic unit 41 (i.e., to bypass the output luminance code previously computed by the arithmetic unit 41 for the pixel which belongs to the first pixel group).

Figure 6:
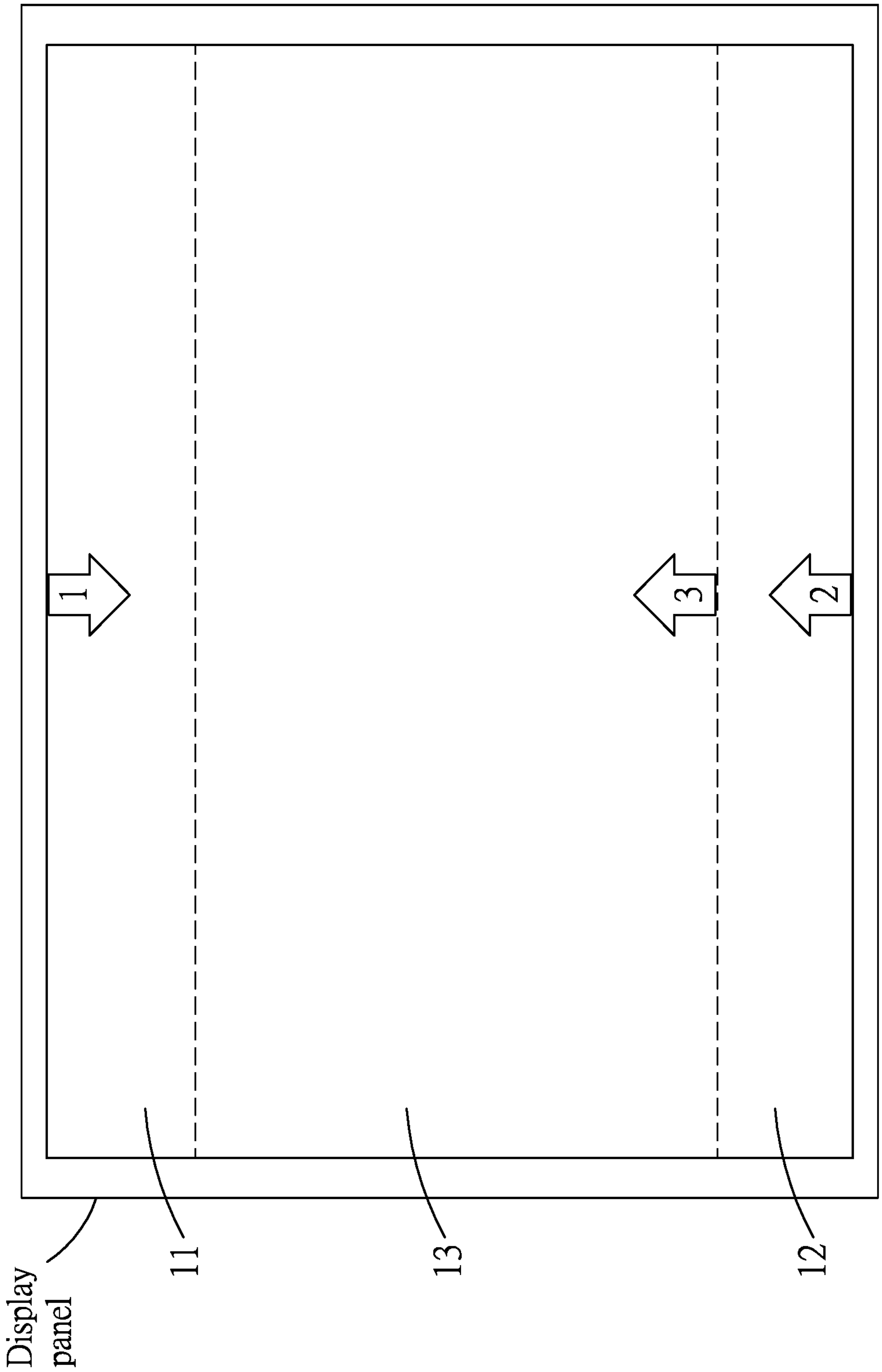
FIG. 6 is a schematic diagram illustrating a scenario of how frame data is outputted for a processor of the embodiment.

As exemplified in FIG. 6, the display area of the display panel is divided into a first display region 11, a second display region 12 and a third display region 13. The first-group densities of the first and second display regions 11, 12 are higher than the predetermined density threshold, and the first-group density of the third display region 13 is lower than the predetermined density threshold. In order to improve the efficiency in time utilization, the processor 31 may be configured to output the frame data to the data conversion module 33 in a manner of outputting the input luminance codes for the pixels in the first display region 11, followed by those of the second display region 12, and then followed by those of the third display region 13. It is noted that, for each of the predetermined display regions, the input luminance codes for the pixels in said display region may be outputted in any desired sequence, such as from top to bottom of the display panel, from bottom to top of the display panel, etc., and this disclosure is not limited in this respect. Taking FIG. 6 as an example, the input luminance codes for the pixels in the first display region 11 may be outputted from top to bottom, the input luminance codes for the pixels in the second display region 12 may be outputted from bottom to top, and the input luminance codes for the pixels in the third display region 13 may be outputted from bottom to top.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A circuit for performing demura operation for a display panel of a computerized device, the display panel including a plurality of pixels, said circuit comprising:

- a storage module storing, for each of the pixels, a pixel information piece that is related to a luminance characteristic of the pixel and that indicates whether the pixel belongs to a first pixel group or a second pixel group; and
- a data conversion module
  - coupled to said storage module for receiving the pixel information pieces for the pixels,
  - disposed to receive, for each frame to be displayed by the display panel, frame data that includes an input luminance code for each of the pixels, and configured to, for each of the pixels, convert the input luminance code for the pixel to an output luminance code based on the corresponding one of the pixel information pieces;

wherein said data conversion module includes an arithmetic unit that includes an arithmetic circuit to process the frame data corresponding to those of the pixels that belong to the first pixel group by computing, for each of the pixels in the first pixel group, the output luminance code based on the input luminance code for the pixel and the corresponding one of the pixel information pieces, and a lookup table unit that is configured to process the frame data corresponding to those of the pixels that belong to the second pixel group, and that includes a mapping module storing multiple sets of luminance codes which correspond to the second pixel group, and configured to, for each of those of the pixels that belong to the second pixel group, determine one of the sets of luminance codes based on the corresponding one of the pixel information pieces, and to map the input luminance code for the pixel to the output luminance code based on the determined one of the sets of luminance codes.

2. The circuit of claim 1, the computerized device further including a main board, wherein, for each of the pixels, the pixel information piece includes a first pixel information piece and a second pixel information piece each related to the luminance characteristic of the pixel and indicating whether the pixel belongs to the first pixel group or the second pixel group;

wherein said storage module includes a first memory unit to be disposed on one of the main board and the display panel, and storing the first pixel information pieces for the pixels, and a second memory unit to be disposed on the other one of the main board and the display panel, and storing the second pixel information pieces for the pixels;

wherein said arithmetic unit is to be disposed on said one of the main board and the display panel, and is coupled to said first memory unit for receiving the first pixel information pieces therefrom; and said lookup table unit is to be mounted to said other one of the main board and the display panel, and is coupled to said second memory unit for receiving the second pixel information pieces therefrom.

3. The circuit of claim 2, wherein the first pixel information pieces for those of the pixels that belong to the second pixel group are the same.

4. The circuit of claim 2, wherein said arithmetic unit is disposed to receive pixel data that is related to the frame data and that includes the input luminance codes for those of the pixels that belong to the first pixel group, and further includes a switch component having a first switch input disposed to receive the pixel data, a second switch input coupled to said arithmetic circuit for receiving the output luminance code for each of those of the pixels that belong to the first pixel group, and a switch output;

wherein said switch output is to be connected to said first switch input when the pixel data corresponds to one of those of the pixels belonging to the second pixel group, and is to be connected to said second switch input when the pixel data corresponds to one of those of the pixels belonging to the first pixel group.

5. The circuit of claim 4, wherein, for each of those of the pixels that belong to the first pixel group, the corresponding pixel information piece includes a set of parameters that corresponds to a predetermined type of function that is used to convert an input luminance code to an output luminance code; and wherein said arithmetic circuit is configured to perform, for each of those of the pixels that belong to the first pixel group, computation based on the predetermined type of function in cooperation with the input luminance code corresponding to the pixel and the set of parameters included in the corresponding one of the pixel information pieces, so as to obtain the output luminance code corresponding to the pixel.

6. The circuit of claim 2, wherein said lookup table unit is disposed to receive pixel data that is related to the frame data and that includes the input luminance codes for those of the pixels that belong to the second pixel group, and further includes a switch component having a first switch input disposed to receive the pixel data, a second switch input coupled to said mapping module for receiving the output luminance code for each of those of the pixels that belong to the second pixel group, and a switch output;

wherein said switch output is to be connected to said first switch input when the pixel data corresponds to one of those of the pixels belonging to the first pixel group, and is to be connected to said second switch input when the pixel data corresponds to one of those of the pixels belonging to the second pixel group.

7. The circuit of claim 6, wherein said mapping module includes:

a memory module that stores the multiple sets of luminance codes; and an address acquiring circuitry that is configured to obtain, for each of those of the pixels that belong to the second pixel group, address information that indicates where the output luminance code which maps the input luminance code for the pixel is stored in said memory module, based on the corresponding one of the pixel information pieces;

wherein said memory module is coupled to said address acquiring circuitry for receiving the address information, and outputs the output luminance code that corresponds to the input luminance code received by said address acquiring circuitry based on the address information.

8. The circuit of claim 1, wherein: a display area of the display panel is divided into multiple predetermined display regions, each having a first-group density defined as a density of pixels belonging to the first pixel group in the predetermined display region;

the predetermined display regions are classified into a first display group and a second display group, the first-group density of each of the predetermined display regions in the first display group being greater than or equal to a predetermined threshold, the first-group density of each of the predetermined display regions in the second display group being smaller than the predetermined threshold; and said circuit further comprises a processor that is configured to output the frame data to said data conversion module in a manner of outputting the input luminance codes for those of the pixels that are located in one of the predetermined display regions which belongs to the second display group last.

* * * * *